United States Patent
Minör

(10) Patent No.: US 8,090,360 B2
(45) Date of Patent: *Jan. 3, 2012

(54) MOBILE WIRELESS COMMUNICATION TERMINALS, SYSTEMS, METHODS, AND COMPUTER PROGRAM PRODUCTS FOR PUBLISHING, SHARING AND ACCESSING MEDIA FILES

(75) Inventor: Sten Minör, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,990

(22) Filed: Feb. 23, 2011

(65) Prior Publication Data

US 2011/0143735 A1    Jun. 16, 2011

Related U.S. Application Data

(63) Continuation of application No. 11/442,751, filed on May 30, 2006, now Pat. No. 7,925,244.

(51) Int. Cl.
*H04L 29/06* (2006.01)
*H04B 7/00* (2006.01)

(52) U.S. Cl. .................................. 455/414.3; 455/41.2

(58) Field of Classification Search ............ 455/414.2, 455/414.1, 414.3, 41.2, 41.3
See application file for complete search history.

(56) References Cited

U.S. PATENT DOCUMENTS

| | | | |
|---|---|---|---|
| 6,372,974 B1 | 4/2002 | Gross et al. | |
| 6,424,820 B1 | 7/2002 | Burdick et al. | |
| 6,965,770 B2 | 11/2005 | Walsh et al. | |
| 7,050,790 B2 | 5/2006 | Yamaga | |
| 7,110,755 B2 | 9/2006 | Shibasaki et al. | |
| 7,433,324 B2 | 10/2008 | Switzer et al. | |
| 2001/0038702 A1 | 11/2001 | Lavoie et al. | |
| 2002/0168938 A1 | 11/2002 | Chang | |
| 2003/0012389 A1 | 1/2003 | Brice et al. | |
| 2003/0032419 A1 | 2/2003 | Shibasaki et al. | |
| 2003/0050058 A1 | 3/2003 | Walsh et al. | |
| 2003/0227478 A1 | 12/2003 | Chatfield | |
| 2004/0014426 A1 | 1/2004 | Moore | |

(Continued)

FOREIGN PATENT DOCUMENTS

EP    1478134 A1    11/2004

(Continued)

OTHER PUBLICATIONS

Jones et al., "*Emerging Technologies*," Language Learning and Technology, Jan. 2002, vol. 6 (1), pp. 6-10.

(Continued)

*Primary Examiner* — Christopher M Brandt
(74) *Attorney, Agent, or Firm* — Myers Bigel Sibley & Sajovec

(57) ABSTRACT

A method for publishing and sharing media files includes: making a published media file available to other wireless communication terminals from a publisher wireless communication terminal; establishing a connection via a wireless communication module of the publisher wireless communication terminal with a requestor wireless communication terminal seeking published media files; sending an identification of the published media file from the publisher wireless communication terminal to the requestor wireless communication terminal; sending a media file request from the requestor wireless communication terminal to the publisher wireless communication terminal requesting the published media file; sending the published media file from the publisher wireless communication terminal to the requestor wireless communication terminal in response to the media file request; and executing playback of the published media file on the requestor wireless communication terminal.

21 Claims, 4 Drawing Sheets

U.S. PATENT DOCUMENTS

| | | | |
|---|---|---|---|
| 2004/0136338 A1 | 7/2004 | Lin et al. | |
| 2004/0259581 A1 | 12/2004 | Crisler et al. | |
| 2005/0054354 A1 | 3/2005 | Roman et al. | |
| 2005/0107073 A1 | 5/2005 | Cheiky et al. | |
| 2005/0149508 A1 | 7/2005 | Deshpande | |
| 2006/0008256 A1 | 1/2006 | Khedouri et al. | |
| 2006/0205449 A1 | 9/2006 | Hillyard | |
| 2006/0265349 A1 | 11/2006 | Hicken | |
| 2007/0161402 A1 | 7/2007 | Ng et al. | |
| 2007/0191008 A1 | 8/2007 | Bucher et al. | |

FOREIGN PATENT DOCUMENTS

| | | |
|---|---|---|
| EP | 1550968 A1 | 7/2005 |
| EP | 1615464 A1 | 1/2006 |
| EP | 2025130 B1 | 1/2010 |
| JP | 2002108908 A | 4/2002 |
| JP | 2002175234 A | 6/2002 |
| JP | 2002366844 A | 12/2002 |
| JP | 2003050589 A | 2/2003 |
| JP | 2005229522 A | 8/2005 |
| JP | 2006004190 A | 1/2006 |
| RU | 2272316 C2 | 3/2006 |
| WO | WO 2002/075523 A1 | 9/2002 |
| WO | WO 2004/023841 A | 3/2004 |
| WO | WO 2004/075169 A2 | 9/2004 |
| WO | WO 2004/104758 A2 | 12/2004 |
| WO | WO 2005/112422 A1 | 11/2005 |
| WO | WO 2006/043141 A1 | 4/2006 |

OTHER PUBLICATIONS

*Bluetooth Media Center MMV-200*, http://www.sonyericsson.com/spg.jsp?cc=us&lc=en&ver=4000&template=pp4_1_1&zone..., 2 pages, dated Jun. 16, 2006.

*Bluetooth Media Center MMV-200*, http://www.sonyericsson.com/spg.jsp?cc=us&lc=en&ver=4000&page=php1_10252&pid=..., 2 pages, dated Jun. 16, 2006.

*Sony Ericsson Bluetooth Media Center MMV-200*, http://www.mobiletechnews.com/info/2005/03/02/021650.html, 1 page, dated Jun. 16, 2006.

*Sony Ericsson unveils the Bluetooth Media Viewer MMV100 printer friendly*, http://www.pocket-lint.co.uk/printnews.php?newsId=238, 1 page, dated Jul. 11, 2005.

*MMS—Share the good times*, http://www.ericsson.com/mms/, 3 pages, dated Jul. 11, 2005.

*Trust- Bluetooth information*, http://www.trust.com/service/help/bluetooth/default.aspx, 12 pages, dated Jul. 11, 2005.

International Search Report and the Written Opinion of the International Searching Authority for PCT Application No. PCT/EP2006/067852 dated Mar. 16, 2007.

Decision on Grant of a Patent for Invention in corresponding Russian Application No. 2008152330 mailed Apr. 11, 2011 (18 pages).

MOBILE WIRELESS COMMUNICATION TERMINALS, SYSTEMS, METHODS, AND COMPUTER PROGRAM PRODUCTS FOR PUBLISHING, SHARING AND ACCESSING MEDIA FILES

RELATED APPLICATIONS

This is a continuation application of U.S. patent application Ser. No. 11/442,751, filed May 30, 2006 now U.S. Pat. No. 7,925,244, the disclosure of which is incorporated herein in its entirety.

FIELD OF THE INVENTION

The present invention relates to electronic devices and, more particularly, to electronic devices, methods and computer program products for playing media files.

BACKGROUND OF THE INVENTION

Music listeners often wish to discuss and enjoy new music. Likewise, marketers and enthusiasts often wish to expose others to new music and artists. These goals are generally accomplished via personal contacts, music magazines, newspapers, record stores, and web sites.

SUMMARY OF THE INVENTION

According to embodiments of the present invention, a method for publishing and sharing media files includes: making a published media file available to other wireless communication terminals from a publisher wireless communication terminal; establishing a connection via a wireless communication module of the publisher wireless communication terminal with a requestor wireless communication terminal seeking published media files; sending an identification of the published media file from the publisher wireless communication terminal to the requestor wireless communication terminal; sending a media file request from the requestor wireless communication terminal to the publisher wireless communication terminal requesting the published media file; sending the published media file from the publisher wireless communication terminal to the requestor wireless communication terminal in response to the media file request; and executing playback of the published media file on the requestor wireless communication terminal.

According to some embodiments, the published media file is a song file.

The method may include: establishing a connection via a wireless communication module of the publisher wireless communication terminal with a plurality of requestor wireless communication terminals seeking published media files; sending identifications of published media files from the publisher wireless communication terminal to each of the requestor wireless communication terminals; sending a media file request from each of the requestor wireless communication terminals to the publisher wireless communication terminal requesting the published media files; sending published media files from the publisher wireless communication terminal to each of the requestor wireless communication terminals in response to the media file requests; and executing playback of the published media files on each of the requestor wireless communication terminals.

According to some embodiments, the method includes issuing a discovery request from the requestor wireless communication terminal seeking wireless communication terminals that are offering published media files, wherein the identification of the published media file is sent from the publisher wireless communication terminal to the requestor wireless communication terminal in response to the discovery request.

The method may further include generating and displaying on the requestor wireless communication terminal a published media file list including the published media file identification.

The method may include sending the published media file to the requestor wireless communication terminal in response to the media file request by streaming the published media file to the requestor wireless communication terminal. The published media file may be sent to the requestor wireless communication terminal in response to the media file request by streaming the published media file to the requestor wireless communication terminal at a rate less than a prescribed standard rate to prevent first quality reproduction during playback.

According to some embodiments, the method includes sending the published media file to the requestor wireless communication terminal in response to the media file request as a truncated sample of the published media file.

The published media file may be sent to the requestor wireless communication terminal in response to the media file request with a Digital Rights Management (DRM) scheme configured to limit access to the published media file.

The published media file may be sent to the requestor wireless communication terminal in response to the media file request with metadata including descriptive information regarding the published media file.

According to some embodiments, the method includes providing a chat/messaging service between the publisher wireless communication terminal and the requestor wireless communication terminal.

The method may include sending feedback regarding the published media file from the requestor wireless communication terminal to the publisher wireless communication terminal.

According to some embodiments, the method includes providing a connection between the requestor wireless communication terminal and an online store and/or informational web site.

According to further embodiments of the present invention, a mobile wireless communication terminal includes a wireless communication terminal and a controller. The wireless communication module is configured to communicate with other communication terminals over a wireless interface. The controller is configured to make a published media file available to other wireless communication terminals, to establish a connection via the wireless communication module with a requestor wireless communication terminal seeking published media files, to send an identification of the published media file to the requestor wireless communication terminal, to receive a media file request from the requestor wireless communication terminal requesting the published media file, and to send the published media file to the requestor wireless communication terminal in response to the media file request for playback.

According to some embodiments, the published media file is a song file.

According to some embodiments, the controller is configured to establish connections via the wireless communication module with a plurality of requestor wireless communication terminals seeking published media files, to send identifications of published media files to each of the requestor wireless communication terminals, to receive media file requests from the requestor wireless communication terminals requesting the published media files; and to send the published media file(s) to the requestor wireless communication terminals in response to the respective media file requests for playback.

The controller may be configured to receive a discovery request from the requestor wireless communication terminal seeking published media files, and to send the identification of the published media file to the requestor wireless communication terminal in response to the discovery request.

According to some embodiments, the controller is configured to send the published media file to the requestor wireless communication terminal in response to the media file request by streaming the published media file to the requestor wireless communication terminal.

The controller may be configured to send the published media file to the requestor wireless communication terminal in response to the media file request as a truncated sample of the published media file.

According to further embodiments, the controller is configured to send the published media file to the requestor wireless communication terminal in response to the media file request with a Digital Rights Management (DRM) scheme configured to limit access to the published media file.

According to some embodiments, the controller is configured to send the published media file to the requestor wireless communication terminal in response to the media file request with metadata including descriptive information regarding the published media file.

The controller may be configured to enable a chat/message service between the wireless communication terminal and the requestor wireless communication terminal.

According to some embodiments, the wireless communication module is configured to communicate with other communication terminals over a direct point-to-point wireless interface, and the controller is configured to establish the connection with the publisher wireless communication terminal via the wireless communication module, send the published media identification to the requestor wireless communication terminal, and send the published media file to the requestor wireless communication terminal for playback all via the direct point-to-point wireless interface.

According to some embodiments, the wireless communication module comprises a Bluetooth transmitter.

According to some embodiments, the wireless communication terminal includes a cellular telephone.

According to embodiments of the present invention, a mobile wireless communication terminal includes a wireless communication module and a controller. The wireless communication module is configured to communicate with other communication terminals over a wireless interface. The controller is configured to search for and locate at least one publisher wireless communication terminal that is offering published media files, to establish a connection with the at least one publisher wireless communication terminal via the wireless communication module, to receive from the at least one publisher wireless communication terminal at least one published media file identification, to generate and display a published media file list including the at least one published media file identification, to execute playback of a selected media file from the published media file list, including retrieving the selected media file from the publisher wireless communication terminal for playback.

According to some embodiments, the published media file is a song file.

The controller may be configured to issue a discovery request seeking wireless communication terminals that are offering published media files.

According to some embodiments, the wireless communication module is configured to communicate with other communication terminals over a direct point-to-point wireless interface, and the controller is configured to establish the connection with the publisher wireless communication terminal via the wireless communication module, receive the published media identification from the publisher wireless communication terminal, and retrieve the published media file from the publisher wireless communication terminal for playback all via the direct point-to-point wireless interface.

According to some embodiments, the wireless communication module comprises a Bluetooth transmitter.

According to some embodiments, the wireless communication terminal includes a cellular telephone.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
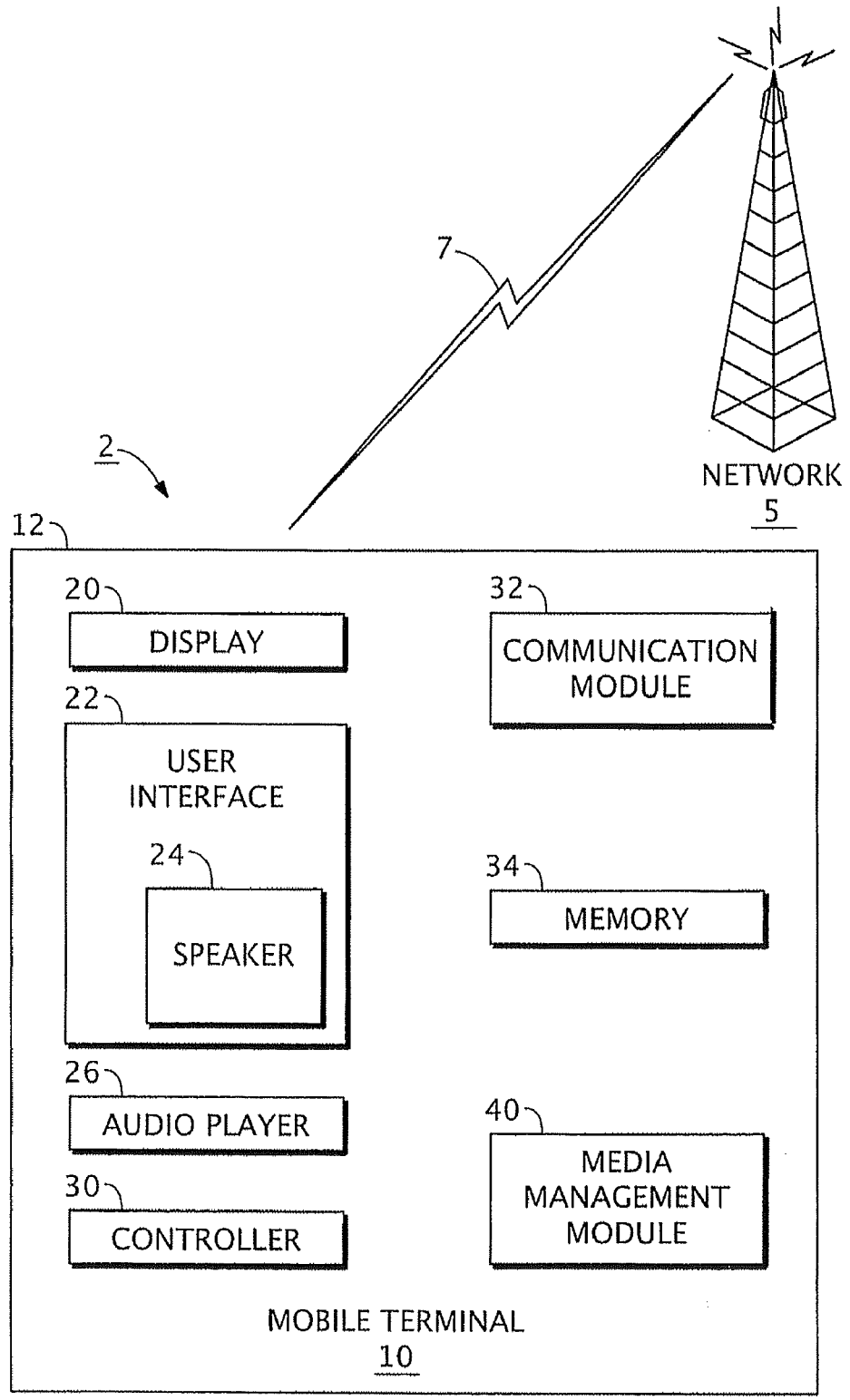
FIG. 1 is a schematic diagram of a mobile wireless communication terminal according to some embodiments of the present invention and an exemplary base station transceiver.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function (s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, "electronic component" means an active device as contrasted with a passive electrical connector or the like. An electronic component may include a processor.

As used herein, "streamed" or "streaming" means that a file, such as a media file (e.g., an audio or song file, a video file, or an image file), is continuously sent via a digital signal to a receiving device where the media file is concurrently played via a suitable receiving application. The digital signal is typically buffered.

As used herein, a "communication terminal" includes, but is not limited to, a terminal that is configured to receive/ transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Some embodiments of the present invention will now be described below with respect to FIGS. 1-5. Some embodiments of the present invention provide mobile wireless communication terminals capable of publishing one or more media files for playback on another wireless communication terminal, and/or capable of requesting and playing back media files published by another wireless communication terminal. Each media file may be an audio or song file, a video clip or video file, or a still image file. Methods, mobile wireless communication terminals, systems and computer program products in accordance with some embodiments of the present invention may be employed to market or expose music and artists or the like to new listeners and consumers.

Referring now to FIG. 1, an exemplary mobile wireless communication terminal 10 in accordance with some embodiments of the present invention is illustrated. The wireless terminal 10 is configured to communicate data with one or more other wireless terminals over a direct wireless communication interface therebetween, over another wireless communication interface through one or more cellular base stations, and/or over another wireless communication interface through a wireless local area network (WLAN) router.

The wireless terminal 10 may be a mobile radiotelephone forming a part of a radiotelephone communication system 2 as illustrated in FIG. 1. The system 2 includes the mobile wireless communication terminal 10 and a base station transceiver, which is part of a wireless communications network 5. In some embodiments of the present invention, the network 5 includes a base station transceiver that includes the radio transceiver(s) that define an individual cell in a cellular network and communicates with the mobile terminal 10 (via an interface 7) and other mobile terminals in the cell using a radio-link protocol. It will be understood that, in some embodiments of the present invention, many base station transceivers may be connected through, for example, a mobile switching center and other devices to define the wireless communications network 5.

The mobile terminal 10 in the illustrated embodiments includes a portable housing assembly 12, a display 20, a user interface 22 (i.e., a man machine interface (MMI)) including a speaker 24 (i.e., a sound transducer), a media player 26, a controller 30, a communication module 32, and a memory 34. The foregoing components of the mobile terminal 10 may be included in many conventional mobile terminals and their functionality is generally known to those skilled in the art. The mobile terminal 10 further includes a media management module 40, which may be stored in the memory 34.

The media player 26 is configured to playback the associated media file format(s) as described herein. Thus, for playback of audio or song files, the media player includes an audio player (e.g., an MP3 player), for playback of video files the media player 26 includes a video player, and for display of still images, the media player 26 includes a still image player.

The display 20 may be any suitable display screen assembly. For example, the display screen 28 may be a liquid crystal display (LCD) with or without auxiliary lighting (e.g., a lighting panel).

The user interface 22 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The speaker 24 generates sound responsive to an input audio signal. The user interface 22 can also include a microphone coupled to an audio processor that is configured to generate an audio data stream responsive to sound incident on the microphone.

The controller 30 may support various functions of the mobile terminal 10A. The controller 30 can be any commercially available or custom microprocessor, for example. In use, the controller 30 of the mobile terminal 10 generates a display image on the display 20. The controller 30 may control the media player 26 and various other components of the mobile terminal 10A.

The memory 34 is configured to store digital information signals and data such as digital media signals and/or digital media files (e.g., digital audio signals and/or digital audio files).

The communication module 32 is configured to communicate data over one or more wireless interfaces (e.g., wireless interfaces 7, 112, 114, 116, 118, 122 as discussed herein (FIGS. 1 and 3)) to another remote wireless terminal as discussed herein. The communication module 32 can include a cellular communication module, a direct point-to-point connection module, and/or a WLAN module.

With a cellular communication module, the wireless terminal 10 can communicate via the base station(s) of the network 5 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

A direct point-to-point connection module may include a direct RF communication module or a direct IR communication module. The direct RF communication module may include a Bluetooth module. With a Bluetooth module, the wireless terminal 10 can communicate via an ad-hoc network through a direct point-to-point interface.

With a WLAN module, the wireless terminal 10 can communicate through a WLAN (e.g., a router 120 (FIG. 3)) using a communication protocol that may include, but is not limited to, 802.11a, 802.11b, 802.11e, 802.11g, and/or 802.11i.

The communication module 32 can include a transceiver typically having a transmitter circuit and a receiver circuit, which respectively transmit outgoing radio frequency signals (e.g., to the network 5, a router or directly to another terminal) and receive incoming radio frequency signals (e.g., from the network 5, a router or directly to another terminal), such as voice and data signals, via an antenna. The communication module 32 may include a short range transmitter and receiver, such as a Bluetooth transmitter and receiver. The antenna may be an embedded antenna, a retractable antenna or any antenna known to those having skill in the art without departing from the scope of the present invention. The radio frequency signals transmitted between the mobile terminal 10 and the network 5, router or other terminal may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The mobile terminal 10 may also be configured to electrically couple with another terminal via a wireline or cable for the transmission of digital communication signals therebetween. The mobile terminal 10 may include further components such as a camera device configured to generate a still image and/or video data stream based on incident light.

According to some embodiments, the mobile terminal 10 is a handheld mobile terminal. By "handheld mobile terminal," it is meant that the outer dimensions of the mobile terminal are adapted and suitable for use by a typical operator using one hand. According to some embodiments, the total volume of the handheld mobile terminal 10 is less than about 200 cc. According to some embodiments, the total volume of the handheld terminal 10 is less than about 100 cc. According to some embodiments, the total volume of the handheld mobile terminal 10 is between about 50 and 100 cc. According to some embodiments, no dimension of the handheld mobile terminal 10 exceeds about 200 mm.

Figure 2:
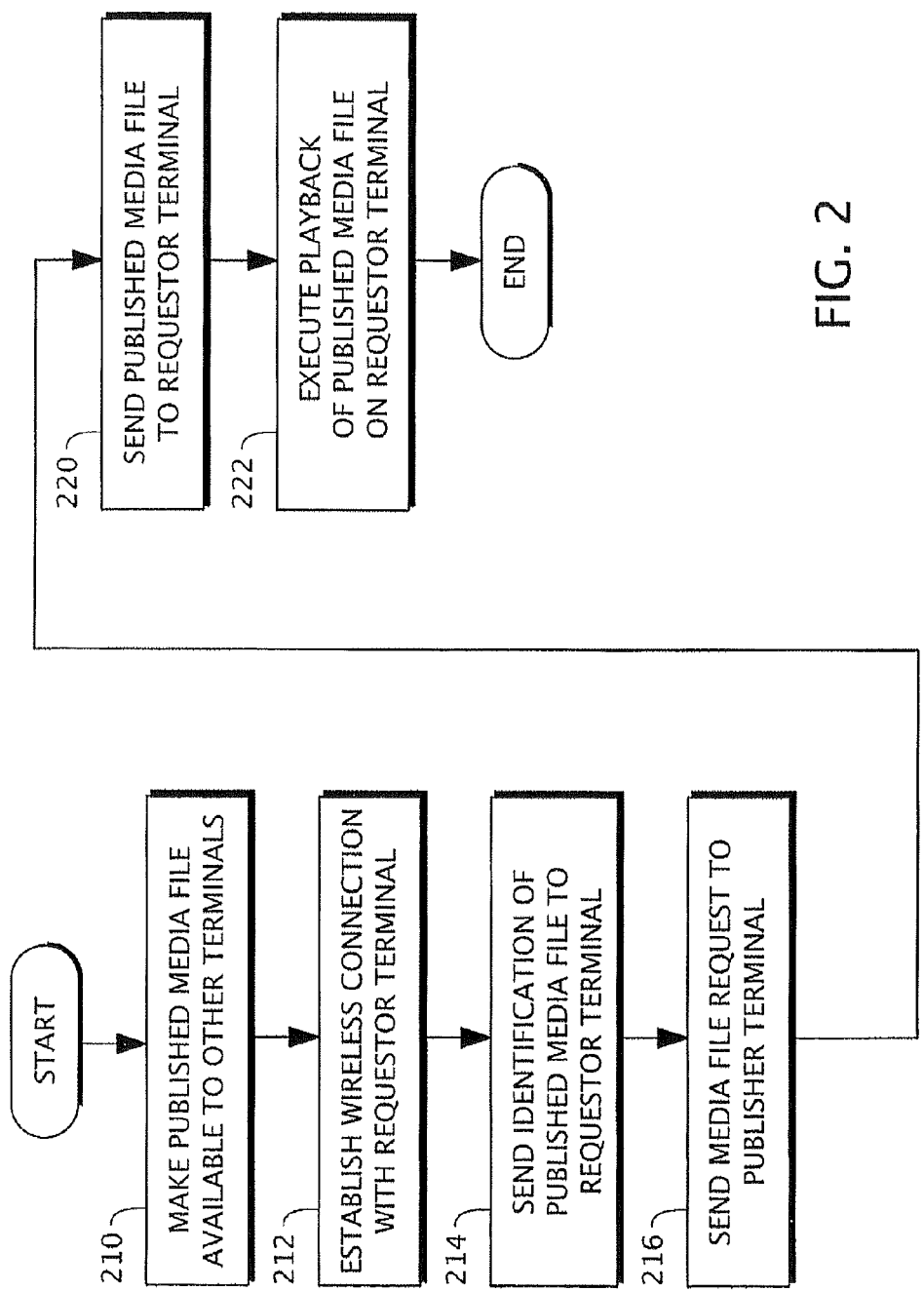
FIG. 2 is a flowchart illustrating methods in accordance with some embodiments of the present invention.

A method for publishing and playing back one or more media files using two or more wireless communication terminals (e.g., two or more of the mobile terminals 10) according to some embodiments of the present invention will now be described with reference to the flowchart of FIG. 2. The method includes making a published media file available to other wireless communication terminals from a publisher wireless communication terminal (Block 210). A connection is established via a wireless communication module of the publisher wireless communication terminal with a requestor wireless communication terminal seeking published media files (Block 212). An identification of the published media file is sent from the publisher wireless communication terminal to the requestor wireless communication terminal (Block 214). A media file request is sent from the requestor wireless communication terminal to the publisher wireless communication terminal requesting the published media file (Block 216). The published media file is sent from the publisher wireless communication terminal to the requestor wireless communication terminal in response to the media file request (Block 220). Playback of the published media file is executed on the requestor wireless communication terminal (Block 222).

According to some embodiments, the published media file is a song file. According to some embodiments, the published media file is a video file. According to some embodiments, the published media file is a still image file.

According to some embodiments, a discovery request is issued from the requestor wireless communication terminal seeking wireless communication terminals that are offering published media files, and identification of the published media file is sent from the publisher wireless communication terminal to the requestor wireless communication terminal in response to the discovery request.

According to some embodiments, connections are established between the publisher wireless communication terminal and a plurality of requestor wireless communication terminals, and the publisher wireless communication terminal receives a plurality of discovery requests from the plurality of requestor wireless communication terminals, sends identifications of published media files to the plurality of requestor wireless communication terminals, receives media file requests from the plurality of requestor wireless communication terminals, and sends published media files to the plurality of requestor wireless communication terminals.

According to some embodiments, communication between the publisher wireless communication terminal and the requestor wireless communication terminal(s) is accomplished via a direct point-to-point interface, such as a Bluetooth wireless RF connection. According to some embodiments, communication between the publisher wireless communication terminal and the requestor wireless communication terminal(s) is accomplished via an indirect interface, such as through a WLAN or cellular-based system. Further aspects and embodiments of the present invention will be apparent from the following descriptions of further embodiments.

Figure 3:
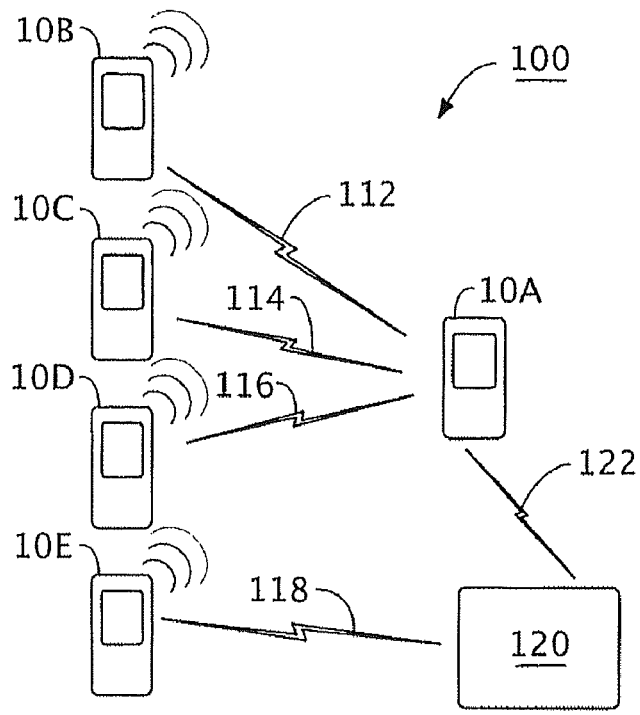
FIG. 3 is a schematic diagram of a media file publishing and playback system according to some embodiments of the present invention.

With reference to FIG. 3, an exemplary media file playback system 100 according to embodiments of the present invention is shown therein. The system 100 includes a plurality of the mobile wireless communication terminals 10A-E.

According to some embodiments, the mobile wireless communication terminals 10A-E are each configured as described above with regard to the mobile wireless communication terminal 10 and include a wireless communication module 32 and a media management module 40 (e.g., software or firmware application). However, the respective media management modules 40 may be differently configured for each terminal 10A-E depending on the intended functionality of the device. For example, one or more the terminals may have a publisher function and a requestor function, a publisher function but not a requestor function, or a requestor function but not a publisher function. For the purposes of illustration, each of the terminals 10A-E has both publisher and requestor functionality. According to some embodiments, all or some of the terminals 10A-E are handheld mobile wireless communication terminals.

The system 100 will now be described using an illustrative example of use wherein the system 100 is a song file playback system. However, the system 100 may alternatively or additionally be configured as a video and/or still image playback system. A plurality of users each have a respective one of the terminals 10A-E. The media player 26 of each terminal 10A-E includes an audio player. The media management modules 40 include song management modules. One or more song files are stored on the mobile terminal 10A. The user of the terminal 10A wishes to make available or share the songs stored on the terminal 10A with the other users within a suitable range or area (i.e., the "neighborhood"). In order to do so, the user of the terminal 10A places the terminal 10A (which may be referred to herein as "the publisher terminal 10A") in a publisher mode. The users of the other terminals 10B-E wish to listen to song files made available by other wireless communication terminals in the neighborhood. In order to do so, the users of the terminals 10B-E place the terminals 10B-E (referred to herein as "the requestor terminals 10B-E") in a requestor mode. The publisher and requestor modes may each be entered by selecting a corresponding button, soft key or the like on the respective terminal 10A-E.

Figure 4:
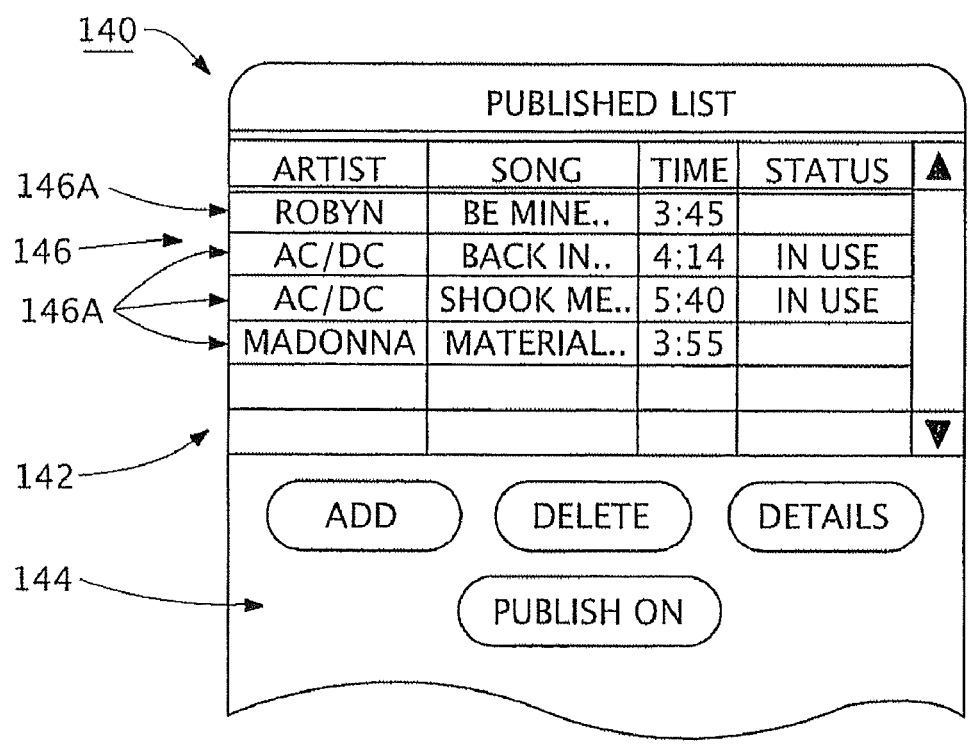
FIG. 4 is a schematic diagram illustrating a display of a mobile wireless communication module according to embodiments of the present invention in a publisher mode.

FIG. 4 is a schematic illustration of an exemplary display 140 as may be provided by the terminal 10A when the publisher function is selected. In the illustrated embodiment, the display 140 includes a published song list field 142 and control buttons 144 (e.g., soft keys). A published song file list 146 is displayed in the play list field 142.

The published song file list 146 includes a row-by-row series of song identifications 146A, each corresponding to a respective song file stored on the terminal 10A. The published song file list 146 may be created by any suitable technique such as those commonly employed to create a song play list from songs stored on a mobile terminal. For example, the terminal 10A may enable the user to search through existing song registries on the terminal 10A and select songs from the registries for placement in the published song file list 146. Various operations for creating and editing the published song file list 146 may be provided on the display 140 (e.g., a "DELETE" key for deleting songs from the list 146, an "ADD" key to search for and add additional songs to the list, and a "DETAILS" key for displaying different levels of detail) or on other display pages. As illustrated, each song identification includes a song artist, a song name, and a song play time corresponding to the associated song file. It will be appreciated that more, less and/or different information may be provided as well.

The user of the terminal 10A may then actuate the "PUBLISH ON" soft key on the display 140 to make the song files of the published song file list 146 available to the terminals 10B-E. In response, the publisher terminal 10A enters the publisher mode. According to some embodiments, when in the publisher mode, the terminal 10A awaits a request message from a requestor terminal.

Figure 5:
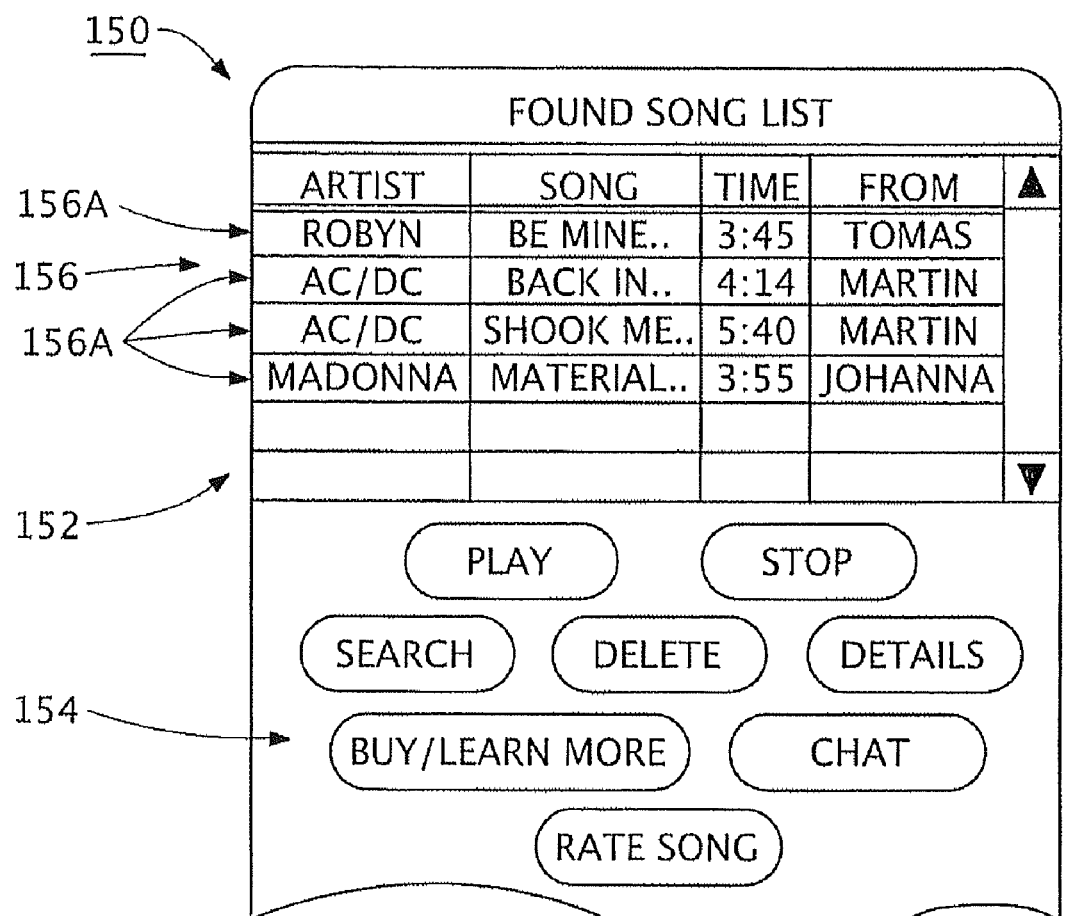
FIG. 5 is a schematic diagram illustrating a display of a mobile wireless communication module according to embodiments of the present invention in a requestor mode.

FIG. 5 is a schematic illustration of an exemplary display 150 as may be provided by each of the requestor terminals 10B-E when the requestor function is selected on the respective requestor terminal 10B-E. In the illustrated embodiment, the display 150 includes a found song list field 152 and control buttons 154 (e.g., soft keys). As discussed below, the song list field 152 will be populated by song files offered by publisher terminals (e.g., the publisher terminal 10A) that are located by the respective one of the requestor terminals 10B-E. For the purpose of explanation, the operation and interactions of the requestor terminal 10B and the publisher terminal 10A will be described below. However, it will be understood that the requestor terminals 10C-E may operate in the same or similar manner as the requestor terminal 10B.

In order to enter the requestor mode, the user of the requestor terminal 10B actuates a "SEARCH" button. In response, the requestor terminal 10B issues or broadcasts a discovery request signal to identify any wireless communication terminals, such as the publisher terminal 10A, that are making song files available.

The publisher terminal 10A receives the discovery request from the requestor terminal 10B and, in response to the discovery request, sends an offer reply message to the requestor terminal 10B and establishes a wireless connection (i.e., communicatively couples) with the requestor terminal 10B. According to some embodiments, the offer reply message includes the identifications of the published song files. According to some embodiments, the terminals 10A, 10B establish the wireless connection automatically, without further intervention by the users of the terminals 10A, 10B. According to some embodiments, the terminal 10A sends the offer reply message to the requestor terminal 10B automatically, without further intervention by the user of the terminal 10A. According to some embodiments the wireless connection is a direct wireless communication interface connection, according to some embodiments, a direct RF connection and, according to some embodiments, a Bluetooth connection. The connections may be established in known manner.

Once the connection is established between the publisher terminal 10A and the requestor terminal 10B, the publisher terminal 10A sends published song identifications designating the published songs stored on the publisher terminal 10A to the requestor terminal 10B. The published song identifications may include metadata including descriptive information regarding the published song files. Such descriptive information may include a song artist, a song name, and a song play time corresponding to the associated song file. According to some embodiments, the terminal 10A sends the published song identifications message to the requestor terminal 10B automatically, without further intervention by the user of the terminal 10A.

The requestor terminal 10B receives the published song identifications from the publisher terminal 10A. The song management module 40 of the requestor terminal 10B creates and maintains a found song list 156 of these song identifications 156A. The found song list 156 represents song files that are available for download from the publisher terminal 10A to the requestor terminal 10B for playback. As illustrated, each found song identification 156A may include the descriptive information (e.g., a song artist, a song name, and a song play time corresponding to the associated song file) as well.

The requestor may selectively initiate and manage play of the published song files in the song list 156 using the control buttons 154, for example. More particularly, the requestor may select a song file identification 156A and actuate the "PLAY" button of the terminal 10B to retrieve and play back the corresponding published song file. The "DELETE" button may be used to delete a song identification 156A from the play list 156. The "DETAILS" button may be used to display more or less detail (e.g., description) regarding a selected song file. The "STOP" button may be used to stop playback of a song file.

Responsive to the requestor actuating the "PLAY" button for a selected song identification 156A, the requestor terminal 10B will automatically send a song file request to the publisher terminal 10A to retrieve the song file corresponding to the song identification. The publisher terminal 10A will receive the song file request and, in response thereto, send a copy of the identified published song file (which is stored on the publisher terminal 10A) to the requestor terminal 10B.

The controller 30 of the requestor terminal 10B then executes playback of the retrieved song file. For example, the song file may be played back through the speaker 24 of the requestor terminal 10B and/or through a headset (e.g., in-ear stereo headset) operatively connected to the requestor terminal 10B.

According to some embodiments, the publisher terminal 10A sends the song file to the requestor terminal 10B as a streaming song file which is played back as it is streamed. It may be preferable or necessary to stream the song file from the participant terminal to the host terminal if the allocated memory space on the requestor terminal 10B is insufficient and/or storage of the song file on the requestor terminal 10B is prevented or illegal.

According to some embodiments, the song file is transmitted at a transmission bit rate less than a prescribed intended or standard bit rate to prevent first quality reproduction. This technique may serve to ensure that a good quality copy cannot be made on the requestor terminal.

According to some embodiments, a copy of the song file is stored on the requestor terminal 10B (e.g., in the memory 34) and played back from the stored copy. This may allow the requestor to play back the song file even after the requestor terminal is out of transmission range of the publisher terminal or WLAN router.

According to some embodiments, the song file, whether streamed or stored in whole, will be automatically disabled or erased (i.e., without user intervention) from the requestor terminal 10B during or after playback using a suitable Digital Rights Management (DRM) scheme or other suitable technique. For example, DRM-enabled song files may be provided with encryption and/or encoded limits that may be fully self-executing or cooperate with a Trusted Platform Module (TMP) of the terminal 10B. According to some embodiments, the DRM scheme permits the song file to be played only a limited number of times and/or only on the requestor terminal that originally receives the song file from the publisher terminal 10A.

According to some embodiments, the published song file as transmitted to the requestor terminal includes only a sample or truncated version of the full song file stored on the publisher terminal. For example, the published song file received by the requestor terminal may include only 30 seconds (e.g., the first 30 seconds) of the original song file stored on the publisher terminal. This truncation may occur automatically such that the publisher need only select and publish the songs, and the song management module 40 will modify the original file for transmission.

The terminals 10C-E may likewise be placed in the requestor mode and search for, request and play back published song files as described for the terminal 10B. As illustrated, the publisher terminal 10A communicates with the requestor terminals 10B, 10C and 10D via direct point-to-point wireless interfaces or links 112, 114 and 116, respectively, and with the requestor terminal 10E via wireless interfaces or links 118, 122 through a WLAN router 120. It will be appreciated that, according to some embodiments, the interfaces may be various combinations of wireless interfaces that are direct (e.g., Bluetooth) or indirect (e.g., via a WLAN router or a cellular network 5). According to some contemplated embodiments, all of the signals provided between the publisher terminal 10A and the requestor terminals 10B-E to execute the song sharing procedure are provided via direct point-to-point wireless interfaces. According to some contemplated embodiments, all of the signals provided between the publisher terminal 10A and the requestor terminals to execute the song sharing procedure are provided via direct wireless radio frequency (RF) interfaces such as Bluetooth interfaces.

Moreover, more than one publisher terminal (i.e., wireless communication terminal in the publisher mode as described for the terminal 10A) may be present in a local wireless network or neighborhood. For example, the terminal 10C may be placed in the publisher mode and make song files thereof available to the other wireless communication terminals in the wireless neighborhood. Thus, when the requestor terminal 10B broadcasts a discovery request signal, both the publisher terminal 10A and the publisher terminal 10C will respond as discussed above and published song file identifications from both publisher terminals 10A, 10C will populate the found song list 146 of the requestor terminal 10B.

Each terminal 10A-E may assume both the requestor mode and the publisher mode at the same time. For example, the terminal 10C may be in the publisher mode as described above and also the requestor mode. As such, its song files are available and delivered to the terminals 10A, 10B, 10D and 10E as discussed, and its user may search for published song files from other terminals in publisher mode, such as the terminal 10A. Because, in accordance with some embodiments of the invention, the response and delivery operations of the publisher mode are executed automatically (without requiring user action), the user of the terminal 10C can search for and sample songs from other publisher terminals without having to tend to the publication operation.

Systems and wireless communication terminals, according to embodiments of the invention, may be provided with additional functionality to facilitate sharing and discussion of the published song files. According to some embodiments, the publisher and requestor terminals (e.g., the terminals 10A and 10B) cooperate to provide a messaging and/or chat service. For example, the terminals may establish (automatically or responsive to a user command) a chat or messaging link or forum between the terminals through which the requestor and the publisher can discuss the song, coordinate meeting to continue discussion, etc. The message/chat service may provide a forum for multiple requestors to discuss the song, etc. The message/chat service may be initiated by actuating a "CHAT" button on the display 150, for example.

According to some embodiments, the requestor terminal can rate a downloaded published song file and send the rating as well as comments back to the publisher terminal using the requestor terminal. According to some embodiments, rating and/or comments are stored on the publisher terminal and associated or indexed with the subject published song file. In this way, the publisher may obtain a stored list of feedback on the song. The rating function may be initiated by actuating a "RATE SONG" button on the display 150, for example.

According to some embodiments, the requestor and publisher terminals may cooperate to provide a connection from the requestor terminal to an online (e.g., Internet accessible) music store where the song file or related items (e.g., a music CD, a DVD of the artist, etc.) can be purchased. A button or the like may be provided on the display of the requestor terminal so that, upon actuation of the button, the connection between the requestor terminal and the online store or the like is automatically established. For example, a "BUY/LEARN MORE" button may be provided on the display 150 to automatically connect to an online store, advertisement website or fan website.

Methods, wireless communication terminals, and systems according to embodiments of the present invention can provide a convenient and enjoyable mechanism for sharing music or music samples between wireless enabled mobile communication terminals. A requestor can obtain and listen to songs from others (e.g., friends or strangers) in the neighborhood. The neighborhood may include a place where people with wireless communication terminals congregate such as a café, school, workplace, airport, train station, etc. A publisher may share song files with others (e.g., friends or strangers) in such venues. The publisher may thereby expose others to the music or musicians to share the enjoyment of the music and/or market the music. The publisher may also obtain feedback on the song files from others, which may be used for marketing analysis. Further, the publisher may direct the requestor to a place or places to purchase or learn more about the music and/or artist.

In the embodiments discussed above, the publisher terminal 10A prepares itself to make the published song files available for downloads and then awaits a discovery request from a requestor terminal 10B-E. Additionally or alternatively, in accordance with some embodiments, the terminal 10A issues or broadcasts periodic or continuous advertisement or offer signals indicating that published songs are available. The terminal 10A may poll or send an invitation or advertisement to all or a selected group of potential requestor terminals (e.g., those within operational range of the publisher terminal's Bluetooth signal). The potential requestor terminals may then initiate the song identification and download process by replying with a discovery request or acceptance of the invitation.

As discussed above, the published media files may be video files or still image files in addition to or instead of audio files. Accordingly, the features, processes, methods, systems and the like described herein with respect to the methods and systems for publishing, sharing and accessing song files can likewise be employed for publishing, sharing and accessing video files and still image files.

The application programs described herein, including the media management module 40, are illustrative of programs that implement various features according to embodiments of the present invention. It will be appreciated that other and/or additional application programs may be employed in accordance with embodiments of the present invention.

Although FIG. 1 illustrates an exemplary hardware/software architecture that may be used in mobile terminals and/or other electronic devices for publication, retrieval and playback of media files, it will be understood that the present invention is not limited to such a configuration but is intended to encompass any configuration capable of carrying out operations described herein. For example, although the memory 34 is illustrated as separate from the controller 30, the memory 34 or portions thereof may be considered as a part of the controller 30. More generally, while particular functionalities are shown in particular blocks by way of illustration, functionalities of different blocks and/or portions thereof may be combined, divided, and/or eliminated. Moreover, the functionality of the hardware/software architecture of FIG. 1 may be implemented as a single processor system or a multi-processor system in accordance with various embodiments of the present invention.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A method for publishing and sharing media files, the method comprising:
    pre-selecting a media file from a collection of media files on a publisher wireless communication terminal for publication; thereafter
        making the selected media file a published media file available to other wireless communication terminals from the publisher wireless communication terminal;
        thereafter receiving a discovery request issued from a requestor wireless communication terminal seeking published media files;
        automatically establishing a connection via a wireless communication module of the publisher wireless communication terminal with the requestor wireless communication terminal in response to the discovery request;
        automatically sending an identification of the published media file from the publisher wireless communication terminal to the requestor wireless communication terminal in response to the discovery request;
        sending a media file request from the requestor wireless communication terminal to the publisher wireless communication terminal requesting the published media file;
        sending the published media file from the publisher wireless communication terminal to the requestor wireless communication terminal in response to the media file request;
        executing playback of the published media file on the requestor wireless communication terminal; and
        prior to receiving the discovery request, placing the publisher wireless communication terminal in a publisher mode and awaiting the discovery request from the requestor wireless communication terminal.

2. The method of claim 1 wherein the published media file is a song file.

3. The method of claim 1 including:
    establishing a connection via a wireless communication module of the publisher wireless communication terminal with a plurality of requestor wireless communication terminals seeking published media files;
    sending identifications of published media files from the publisher wireless communication terminal to each of the requestor wireless communication terminals;
    sending a media file request from each of the requestor wireless communication terminals to the publisher wireless communication terminal requesting the published media files;
    sending published media files from the publisher wireless communication terminal to each of the requestor wireless communication terminals in response to the media file requests; and
    executing playback of the published media files on each of the requestor wireless communication terminals.

4. The method of claim 1 including issuing the discovery request from the requestor wireless communication terminal seeking wireless communication terminals that are offering published media files.

5. The method of claim 1 including generating and displaying on the requestor wireless communication terminal a published media file list including the published media file identification.

6. The method of claim 1 including sending the published media file to the requestor wireless communication terminal in response to the media file request by streaming the published media file to the requestor wireless communication terminal.

7. The method of claim 6 including sending the published media file to the requestor wireless communication terminal in response to the media file request by streaming the published media file to the requestor wireless communication terminal at a rate less than a prescribed standard rate to prevent first quality reproduction during playback.

8. The method of claim 1 including sending the published media file to the requestor wireless communication terminal in response to the media file request as a truncated sample of the published media file.

9. The method of claim 1 including sending the published media file to the requestor wireless communication terminal in response to the media file request with a Digital Rights Management (DRM) scheme configured to limit access to the published media file.

10. The method of claim 1 including sending the published media file to the requestor wireless communication terminal in response to the media file request with metadata including descriptive information regarding the published media file.

11. The method of claim 1 including providing a chat/messaging service between the publisher wireless communication terminal and the requestor wireless communication terminal that enables the publisher wireless communication terminal and the requestor wireless communication terminal to discuss the published media file via the chat/messaging service.

12. The method of claim 1 including sending feedback regarding the published media file from the requestor wireless communication terminal to the publisher wireless communication terminal, wherein the feedback includes a rating of the published media file and/or comments regarding the published media file.

13. The method of claim 1 including providing a connection between the requestor wireless communication terminal and an online store and/or informational website.

14. The method of claim 1 further including broadcasting advertisement signals from the publisher wireless communication terminal to potential requestor wireless communication terminals, wherein the advertisement signals indicate that the pre-selected media file is available for transfer to the potential requestor wireless communication terminals.

15. A mobile wireless communication terminal comprising:

a wireless communication module that is configured to communicate with other communication terminals over a wireless interface; and a controller that is configured to pre-select a media file from a collection of media files on the mobile wireless communication terminal for publication, to thereafter make the selected media file a published media file available to other wireless communication terminals, to thereafter receive a discovery request issued from a requestor wireless communication terminal seeking published media files, to automatically establish a connection via the wireless communication module with the requestor wireless communication terminal in response to the discovery request, to automatically send an identification of the published media file to the requestor wireless communication terminal in response to the discovery request, to receive a media file request from the requestor wireless communication terminal requesting the published media file, to send the published media file to the requestor wireless communication terminal in response to the media file request for playback; and to place the mobile wireless communication terminal in a publisher mode and await the discovery request from the requestor wireless communication terminal prior to receiving the discovery request.

16. The mobile wireless communication terminal of claim 14 wherein the published media file is a song file.

17. The mobile wireless communication terminal of claim 14 wherein the controller is configured to establish connections via the wireless communication module with a plurality of requestor wireless communication terminals seeking published media files, to send identifications of published media files to each of the requestor wireless communication terminals, to receive media file requests from the requestor wireless communication terminals requesting the published media files, and to send the published media file(s) to the requestor wireless communication terminals in response to the respective media file requests for playback.

18. A method for publishing and sharing media files, the method comprising:

making a published media file available to other wireless communication terminals from a publisher wireless communication terminal; thereafter broadcasting advertisement signals from the publisher wireless communication terminal to potential requestor wireless communication terminals, wherein the advertisement signals indicate that the published media file is available for transfer to the potential requestor wireless communication terminals;

establishing a connection via a wireless communication module of the publisher wireless communication terminal with a requestor wireless communication terminal seeking published media files;

sending an identification of the published media file from the publisher wireless communication terminal to the requestor wireless communication terminal;

sending a media file request from the requestor wireless communication terminal to the publisher wireless communication terminal requesting the published media file;

sending the published media file from the publisher wireless communication terminal to the requestor wireless communication terminal in response to the media file request; and executing playback of the published media file on the requestor wireless communication terminal.

19. The method of claim 18 wherein the published media file is a song file.

20. The method of claim 18 including:

establishing a connection via a wireless communication module of the publisher wireless communication terminal with a plurality of requestor wireless communication terminals seeking published media files;

sending identifications of published media files from the publisher wireless communication terminal to each of the requestor wireless communication terminals;

sending a media file request from each of the requestor wireless communication terminals to the publisher wireless communication terminal requesting the published media files;

sending published media files from the publisher wireless communication terminal to each of the requestor wireless communication terminals in response to the media file requests; and executing playback of the published media files on each of the requestor wireless communication terminals.

21. A mobile wireless communication terminal comprising:

a wireless communication module that is configured to communicate with other communication terminals over a wireless interface; and a controller that is configured to make a published media file available to other wireless communication terminals from the mobile wireless communication terminal; to thereafter broadcast advertisement signals from the mobile wireless communication terminal to potential requestor wireless communication terminals, wherein the advertisement signals indicate that the published media file is available for transfer to the potential requestor wireless communication terminals, to establish a connection via a wireless communication module of the mobile wireless communication terminal with a requestor wireless communication terminal seeking published media files, to send an identification of the published media file from the mobile wireless communication terminal to the requestor wireless communication terminal, to receive a media file request from the requestor wireless communication terminal requesting the published media file, to send the published media file from the mobile wireless communication terminal to the requestor wireless communication terminal in response to the media file request, and to execute playback of the published media file on the requestor wireless communication terminal.

* * * * *